United States Patent [19]
Radi et al.

[11] Patent Number: 6,070,669
[45] Date of Patent: Jun. 6, 2000

[54] ADJUSTABLE WELLHEAD CONNECTOR

[75] Inventors: Amin Radi, Houston; Thomas F. Sweeney, Tomball, both of Tex.

[73] Assignee: ABB Vetco Gray Inc., Houston, Tex.

[21] Appl. No.: 09/022,159

[22] Filed: Feb. 11, 1998

Related U.S. Application Data

[60] Provisional application No. 60/038,100, Feb. 15, 1997.

[51] Int. Cl.⁷ .......................... E21B 33/038; F16L 55/00
[52] U.S. Cl. .................... 166/368; 166/341; 166/344; 285/12; 285/148.23
[58] Field of Search ...................... 166/335, 338, 166/344, 348, 359, 345, 346, 382, 379, 75.14, 85.3, 89.1, 88.1; 285/12, 148.23

[56] References Cited

U.S. PATENT DOCUMENTS

| | | |
|---|---|---|
| Re. 35,533 | 6/1997 | Adamek et al. . |
| 4,593,937 | 6/1986 | Schawann et al. ................. 166/344 X |
| 4,693,497 | 9/1987 | Pettus et al. ............................... 285/12 |
| 4,726,424 | 2/1988 | Raulins ............................... 166/341 X |
| 4,856,594 | 8/1989 | Jennings ............................... 166/345 X |
| 4,902,044 | 2/1990 | Williams et al. ..................... 166/344 X |
| 5,299,644 | 4/1994 | Eckert ...................................... 166/379 |

OTHER PUBLICATIONS

McEvoy's "MD" Wellhead Connector: 18 3/4" 10000 PSI. and 15000 PSI. 4573 Subsea Wellhead Connectors; McEvoy–Willis.

Primary Examiner—Dennis L. Taylor
Attorney, Agent, or Firm—Felsman Bradley Vaden Gunter & Dillon, LLP; James E. Bradley

[57] ABSTRACT

An adjustable wellhead connector is secured to the lower end of a BOP and riser assembly and has a housing which surrounds a groove profile on the upper outer surface of a first wellhead housing. The housing has a window on its inner surface which contains a removable first locking member. The first locking member has a groove profile on its inner diameter which mates with the groove profile on the first wellhead housing. The first locking member is movable between inner and outer radial positions which correspond to locked and unlocked positions, respectively. The first locking member is moved by a hydraulic system contained within the housing. The wellhead connector may be readily adapted to connect to a second wellhead housing having a different outer diameter than the first wellhead housing by replacing the first locking member with a second locking member. The second locking member enables the wellhead connector to connect a riser to the second wellhead housing.

18 Claims, 4 Drawing Sheets

ADJUSTABLE WELLHEAD CONNECTOR

This application is a continuation of provisional application Ser. No. 60/038,100 filed Feb. 15, 1997.

TECHNICAL FIELD

This invention relates in general to subsea wellhead/horizontal tree equipment and particularly to a wellhead connector for connecting a BOP and riser assembly to a wellhead/horizontal tree wherein the connector is adjustable for various diameters.

BACKGROUND ART

Subsea wellhead housings are generally cylindrical in shape and extend upward from the sea floor. During drilling, a BOP and riser assembly is typically joined to the wellhead housing with an external wellhead connector. Most wellhead housings have a groove profile at the upper end of their cylindrical outer surface. The groove profiles typically comprise a series of grooves or ribs which provide the wellhead connector with a means for gripping the wellhead housing.

Wellhead housings are provided in a variety of sizes, including 27 and 30-inch outer diameters. Unfortunately, prior art wellhead connectors have fixed inner diameters and, thus, are designed to be used with only one size of wellhead housing. Moreover, prior art wellhead connectors are not readily adaptable to be modified for use with wellhead housings of differing sizes. A wellhead connector which is easily adaptable to wellhead housings of various sizes within each family of wellhead housing design is needed.

SUMMARY OF THE INVENTION

An adjustable wellhead connector is secured to the lower end of a BOP and riser assembly and has a housing which surrounds a groove profile on the upper outer surface of a first wellhead housing. The housing has a window on its inner surface which contains a removable first locking member. The first locking member has a groove profile on its inner diameter which mates with the groove profile on the first wellhead housing. The first locking member is movable between inner and outer radial positions which correspond to locked and unlocked positions, respectively. The first locking member is moved by a hydraulic system contained within the housing. The wellhead connector may be readily adapted to connect to a second wellhead housing having a different outer diameter than the first wellhead housing by replacing the first locking member with a second locking member. The second locking member enables the wellhead connector to connect a riser to the second wellhead housing.

DESCRIPTION OF THE PREFERRED EMBODIMENT

Figure 1:
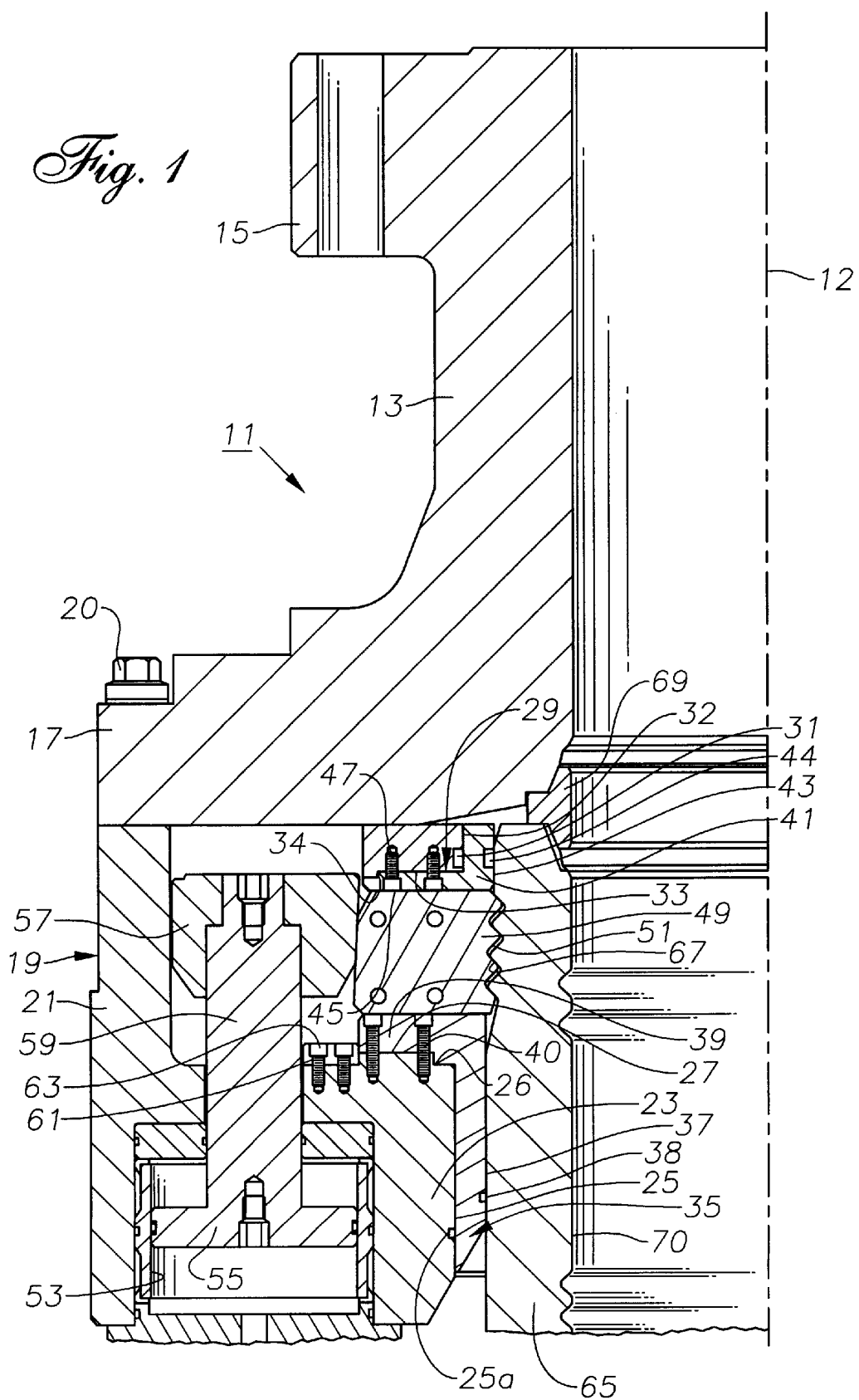
FIG. 1 is a sectional view of an adjustable wellhead connector constructed in accordance with the invention, shown with one size of wellhead housing.

Referring to FIG. 1, wellhead connector 11 includes a large tubular adapter 13. Adapter 13 has an upper flange 15 that bolts to the lower end of a blowout preventer (BOP) which is connected to a riser (not shown) that extends to a surface vessel or platform. Adapter 13 has a lower flange 17 extending radially outward. A cylindrical housing 19 is bolted to the lower side of lower flange 17 with bolts 20. Housing 19 has an outer wall 21 that extends downward from lower flange 17. Housing 19 has an inner wall 23 that is concentric and radially inward from outer wall 21. Inner wall 23 has an inner diameter 25 that is cylindrical and contains a seal 25a.

A window or annular space 29 is located above inner wall 23. Window 29 has a lower shoulder 27 which is perpendicular to a longitudinal axis 12 of connector 11, and which extends radially outward from inner diameter 25. A shear resisting shoulder 26 is formed at the junction between inner diameter 25 and the lower shoulder 27. An upper shoulder 33 is located on the lower end of adapter 13, forming an upper edge of window 29. Upper shoulder 33 extends radially outward from a cylindrical upper inner wall 32 parallel to and spaced above lower shoulder 27. A shear resisting shoulder 34 is formed in shoulder 33. The inner diameter of upper inner wall 32 is slightly smaller than housing inner diameter 25. A seal 31 is optionally located in upper inner wall 32.

A lower insert 35 is mounted to housing inner wall 23. Lower insert 35 is generally in the shape of an inverted L in cross-section, having a cylindrical portion 37 extending downward and a flange 39 on the upper end extending radially outward into window 29. Flange 39 overlies shoulder 27, and cylindrical portion 37 is closely received within inner diameter 25. Bolts 40 extend through flange 39 for securing lower insert 35 in place. A seal 38 is optionally located in the inner diameter of lower insert 35.

An upper insert 41 is mounted to upper shoulder 33. Upper insert 41 has a cylindrical portion 43 that mates with the inner diameter of upper inner shoulder 32. Upper insert 41 has a seal 44 on its inner diameter. A flange 45 extends radially outward through window 29 and overlies shoulder 33. Bolts 47 extend into shoulder 33 to secure upper insert 41 in place. Inserts 35, 41 decrease the axial height of window 29.

A locking member 49 comprising a plurality of dogs is employed with wellhead connector 11. Each dog 49 locates within window 29 and has a plurality of grooves or teeth 51 on its inner surface. Dogs 49 have a generally rectangular cross-sectional shape.

A piston cylinder 53 is located within housing 19. Piston cylinder 53 contains a piston 55 and is supplied with hydraulic fluid for stroking piston 55 up and down. Piston 55 is secured to a cam ring 57 by means of its shaft 59. Cam ring 57 has an inner diameter that engages the outer surfaces of dogs 49. A stop plate 61 is mounted to inner wall 23 radially outward of shoulders 27. Stop plate 61 limits the downward travel of cam ring 57. Bolts 63 secure stop plate 61 releasably to enter wall 23.

Wellhead connector 11 connects to a subsea wellhead housing 65 during drilling operations. Wellhead housing 65 is a tubular member located at the sea floor. Alternatively, the present invention could also be used with a horizontal tree (not shown) having a similar profile as wellhead housing 65. Wellhead housing 65 has grooves 67 on its exterior that are engaged by teeth 51 of dogs 49. A seal 69 seals the bore 70 of wellhead housing 65 to adapter 13.

In the embodiment shown in FIG. 1, the operator will lower wellhead connector 11 and the attached BOP on a string of riser down over a previously installed wellhead housing 65. The inner diameter of lower insert 35 snugly fits over the outer diameter of wellhead housing 65 at the point of engagement. The inner diameter of upper insert 41, which is smaller than the inner diameter of lower insert 35, snugly fits over the outer diameter of wellhead housing 65 at the point of engagement. Optionally, seals 44 and 38 will sealingly engage the outer diameter of wellhead housing 65. After wellhead connector 11 lands on the rim of wellhead housing 65, the operator supplies hydraulic fluid pressure to piston cylinder 53 to stroke piston 55 downward. Cam ring 57 pushes dogs 49 radially into engagement with wellhead housing grooves 67. A large downward preload force is applied to the rim of wellhead housing 65 as a result of teeth 51 of dogs 49 engaging grooves 67. Stop plate 61 limits the downward travel of cam ring 57 to prevent applying too much preload to the upper rim portion of wellhead housing 65. Too much preload could cause permanent damage to this portion of wellhead housing 65. The operator may now continue drilling operations.

Figure 2:
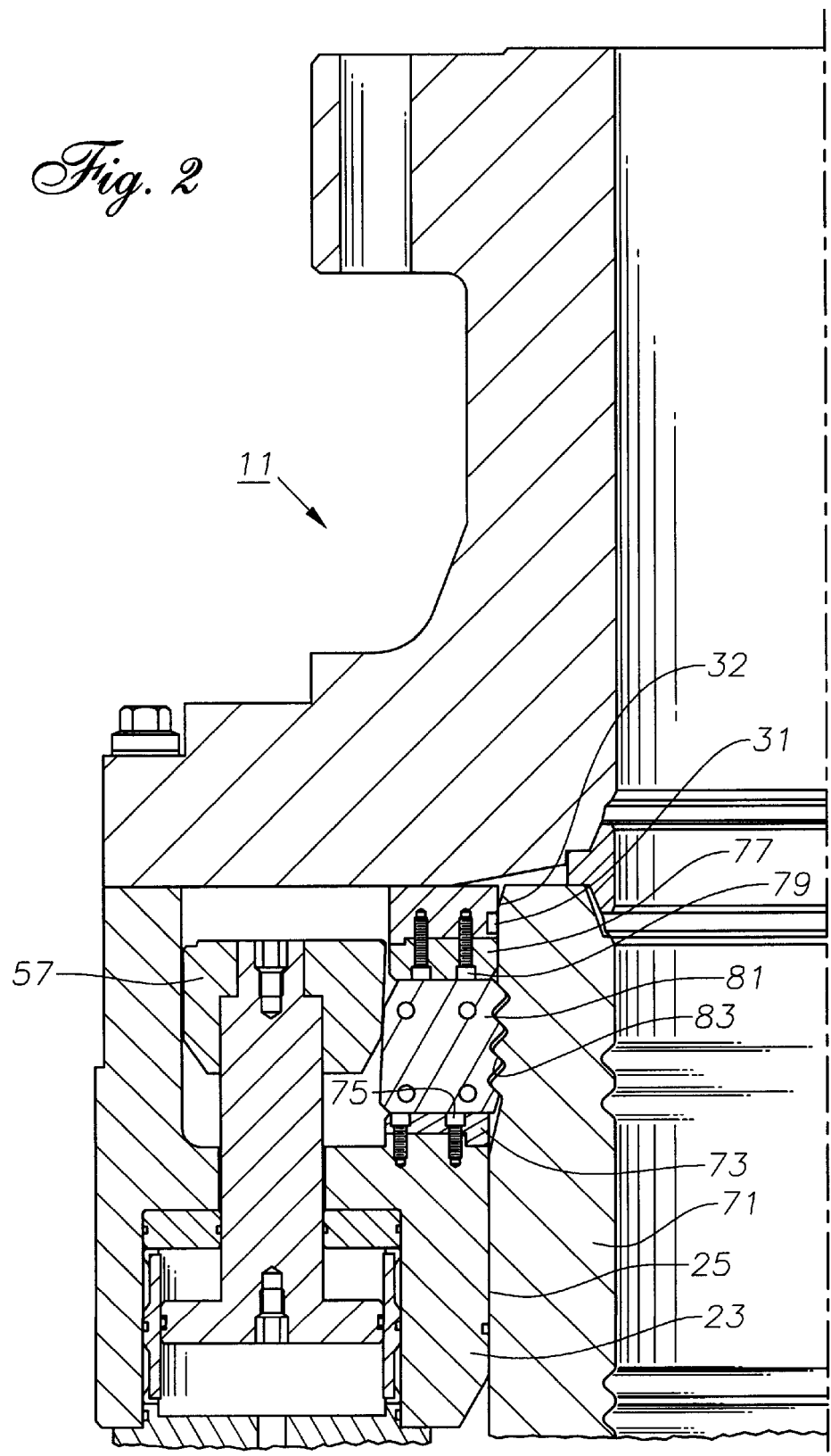
FIG. 2 is a sectional view of the wellhead connector of FIG. 1, adjusted for a larger diameter wellhead housing.

In the embodiment of FIG. 1, inserts 35, 41 are sized for fitting on a wellhead housing 65 of a selected size. For example, wellhead housing 65 may have a 27-inch outer diameter at the point of engagement with lower insert 35. In some instances, wellhead housings having a thicker tubular wall are employed because of greater bending moment and/or pressure expected. The thicker tubular section results in a greater outer diameter. Ordinarily, this would require a completely different wellhead connector, one which is sized to fit the greater diameter. In this invention, wellhead connector 11 can be adjusted to accommodate larger wellhead housings. For example, wellhead housing 71 of FIG. 2 has an outer diameter of 30 inches.

To change wellhead connector 11 to handle the larger wellhead housing 71, the operator removes lower insert 35, upper insert 41, stop plate 61 and dogs 49. The operator replaces these components with components sized for wellhead housing 71. In this instance, lower insert 73 comprises a flat circular plate, having no lower cylindrical portion such as cylindrical portion 37 of lower insert 35 (FIG. 1). The inner diameter 25 of housing inner wall 23 and the inner diameter of upper inner wall 32 closely receive the outer diameter of wellhead housing 71. Lower insert 73 will be secured by bolts 75.

Upper insert 77 is also a flat plate rather than angled as upper insert 41 (FIG. 1). Upper insert 77 has no cylindrical member overlying the inner diameter of upper inner wall 32. Rather, the inner diameter of upper inner wall 32 closely receives and seals against the upper outer diameter of wellhead housing 71. Bolts 79 are used to fasten upper insert 77 to upper shoulder 33.

Figure 3:
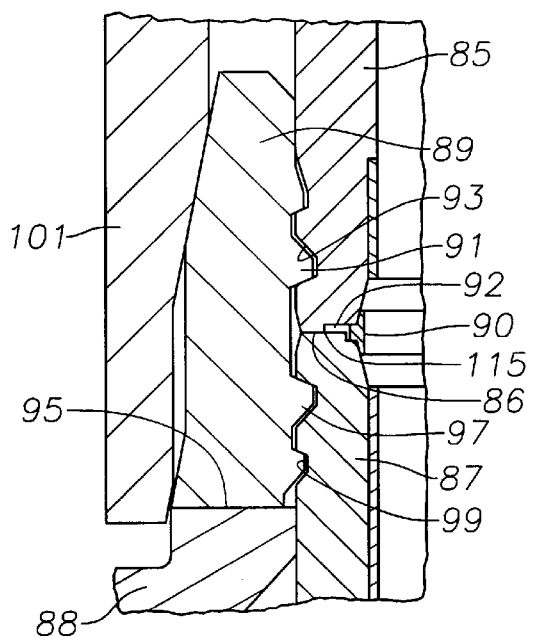
FIG. 3 is a partial sectional view of a second embodiment of the wellhead connector of FIG. 1.

The axial distance between lower insert 73 and upper insert 77 is slightly greater than the corresponding axial thickness between inserts 35, 41 in FIG. 1. Dogs 81 are longer than the dogs in FIG. 1 because in the preferred wellhead housing 71, grooves 83 will be spaced farther apart on the wellhead housing 71 than grooves 67 are on the wellhead housing 65. This difference is due to the higher preload force required for the larger diameter wellhead housing 71. The removal of stop plate 65 (FIG. 1) allows the greater preload force by allowing a longer stroke of cam ring 57. Referring to FIG. 3, the wellhead connector includes an adapter 85 that has a lower rim 86 that lands on an upper rim of a wellhead housing 87. A seal 90 locates at rim 86. A shim 92 is located in an annular recess 115 in rim 86 for adjusting to the thickness of a rib on seal 90.

The wellhead connector of FIG. 3 has a housing 88 that carries a plurality of dogs 89 (only one shown) spaced circumferencially around adapter 85. Each dog 89 has a plurality of upper teeth 91 that engage grooves 93 in adapter 85. Dogs 89 are moveable radially on a shoulder 95 of housing 88. Dogs 89 have a plurality of lower teeth 97 that engage grooves 99 formed on the outer diameter of wellhead housing 87. In the embodiment shown, the outer diameter of wellhead housing 87 is substantially the same as the outer diameter of adapter 85. A cam ring 101 is stroked by hydraulic means (not shown) between upper and lower positions to push dogs 89 radially into engagement with grooves 93, 99.

Figure 4:
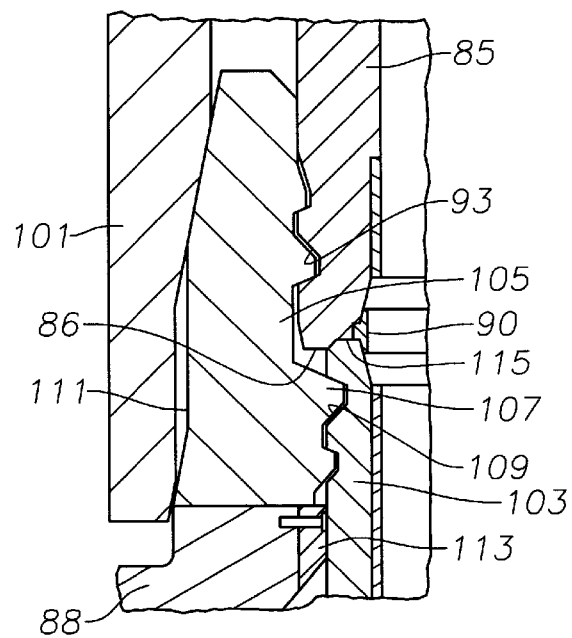
FIG. 4 is a partial sectional view of the wellhead connector of FIG. 3, shown installed on a smaller outer diameter wellhead housing.

In FIG. 4, the wellhead connector is shown landed on a wellhead housing 103 that has a smaller outer diameter than wellhead housing 87 of FIG. 3. In this instance, the wellhead connector must be adjusted. One adjustment is made by changing dogs 89 with dogs 105. Dogs 105 have a greater radial thickness from lower teeth 107 to back wall 111 than dogs 89. Lower teeth 107 will engage grooves 109 in wellhead housing 103, even though grooves 109 are of a smaller diameter than grooves 93 of wellhead housing 87. The dimensions of the upper portion of dogs 105 will be the same as dogs 89.

Also, in the embodiment of FIG. 4, shim 92 is not utilized. The distance from grooves 109 to the upper rim of wellhead housing 103 is less than the distance from grooves 99 to the rim of wellhead housing 87. This difference is due to the lesser amount of preload needed with wellhead housing 103 than wellhead housing 87. A spacer ring 113 is secured to the inner diameter of housing 88 when connected to smaller diameter housing 103. Recess 115 in rim 86 of adapter 85 lands on the upper rim of wellhead housing 103, rather than spaced above it as in FIG. 3. This changes the dimensions between the upper and lower sets of grooves 93, 109 from those in FIG. 3. As a result, the axial dimension from the upper portion of dogs 105 to lower teeth 107 is slightly less than that in FIG. 3. All the other components of the wellhead connector of FIG. 4 are the same as in FIG. 3.

Figure 5:
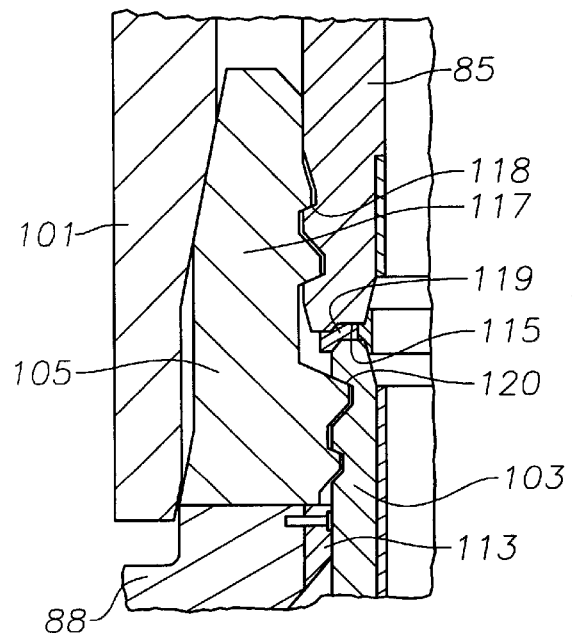
FIG. 5 is a partial sectional view of the wellhead connector of FIG. 3, shown in an alternate manner of adjustment than that of FIG. 4 for connecting to the wellhead housing of FIG. 4.

In FIG. 5, dogs 117 are the same as dogs 105, except that the axial distance between upper teeth 118 and lower teeth 120 differs from that in FIG. 4 and is the same as that in FIG. 3. A shim 119 that has a greater thickness than shim 92 is employed in recess 115 of adapter 85. All the other components are the same as in FIG. 3.

Figure 6:
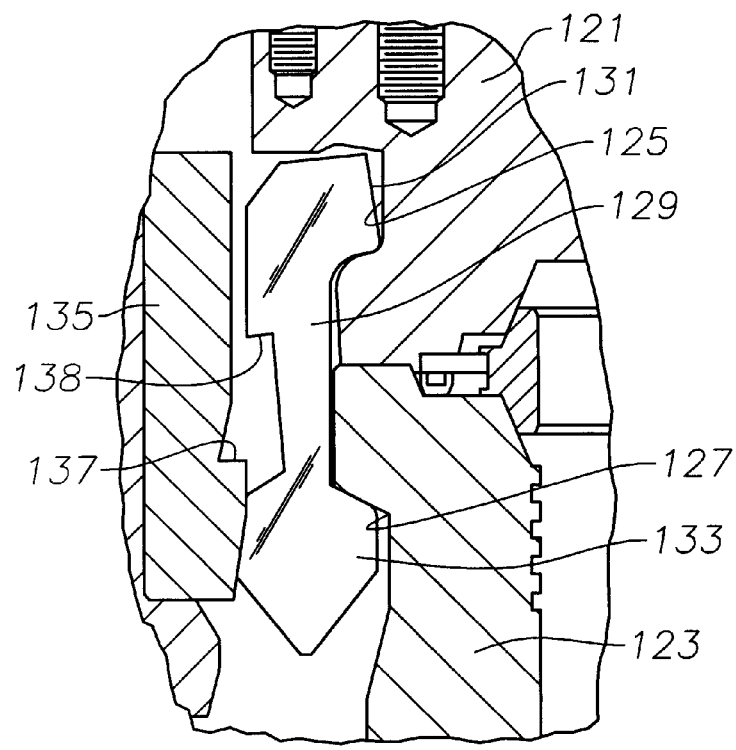
FIG. 6 is a partial sectional view of a third embodiment of the wellhead connector of FIG. 1.

In the embodiment of FIG. 6, the wellhead connector includes an adapter 121 that lands on a different wellhead housing 123. Adapter 121 has a single upper groove or cam shoulder 125 and a single lower groove or cam shoulder 127 on wellhead housing 123. The locking member comprises a plurality of collets 129 which will rotate or rock between engaged and disengaged position. Each collet 129 has an upper lobe 131 that engages upper groove 125. Each collet 129 also has a lower lobe 133 that engages lower groove 127.

A cam ring 135 is stroked between upper and lower positions by a hydraulic means (not shown). Cam ring 135 has an upward facing hook 137 that engages a hook 138 on the back of each collet 129. Upward movement of cam ring 135 causes each collet 129 to rotate, with lower lobe 133 disengaging from lower groove 127.

Figure 7:
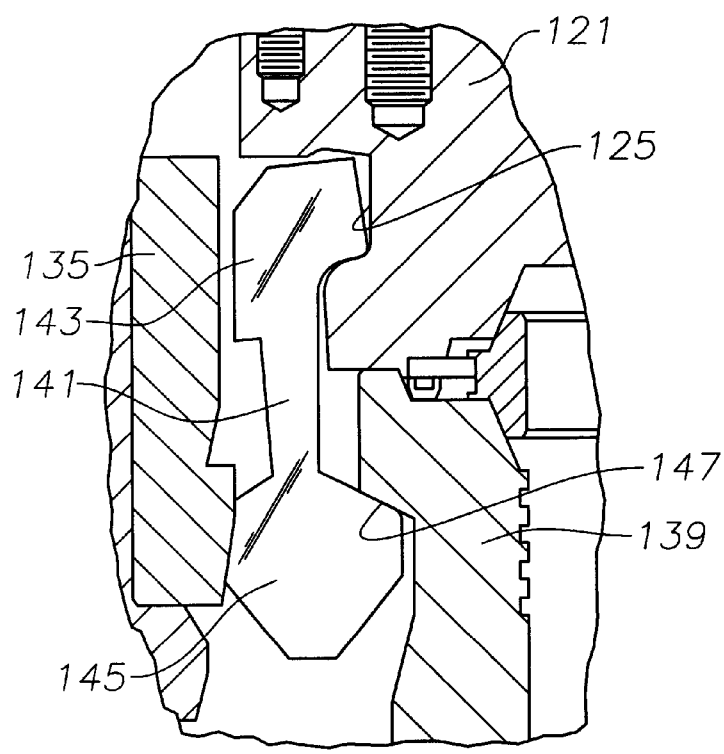
FIG. 7 is a partial sectional view of the wellhead connector of FIG. 6, shown installed on a wellhead housing having a smaller outer diameter than the wellhead housing of FIG. 6.

In the embodiment of FIG. 7, the outer diameter of wellhead housing 139 is smaller than wellhead housing 123 in FIG. 6, but otherwise has the same structure. In this embodiment, the only adjustment needed is to collets 129. They are replaced by collets 141. Each collet 141 has an upper lobe 143 that engages groove 125 and a lower lobe 145 that engages lower groove 147. The radial thickness of lower lobe 145 is thicker than upper lobe 143 to be able to engage lower groove 147, which has a lesser outer diameter than lower groove 127 of FIG. 6.

The invention has several advantages. The connector is easily adaptable to wellhead housings of various sizes within each family of wellhead housing design. The parts which must be changed to accommodate different sized housings have been kept to a minimum and essentially include the wear rings and connector dogs. The hydraulic system used to move the dogs is also interchangeable.

While the invention has been shown or described in only some of its forms, it should be apparent to those skilled in the art that it is not so limited, but is susceptible to various changes without departing from the scope of the invention.

We claim:

1. A method for connecting a tubular member to a first well member having an axis and a cylindrical sidewall with a groove profile on an exterior surface of the sidewall, comprising:

(a) mounting a connector to an end of the tubular member, the connector having a longitudinal axis and first and second locking members which are interchangeably mountable in the connector, wherein each of the locking members is radially movable between locked and unlocked positions and wherein the first locking member has a profile engaging portion with substantially the same configuration as a profile engaging portion of the second locking member but differs in inner diameter when in the locked position;

(b) installing the first locking member in the connector in the unlocked position;

(c) positioning the connector adjacent to the first well member such that the profile engaging portion of the first locking member aligns with the profile of the first well member; then (d) moving the first locking member to the locked position so that the first well member is rigidly connected to the tubular member; then (e) disconnecting the connector from the first well member;

(f) removing the first locking member from the connector;

(g) installing the second locking member in the connector in the unlocked position;

(h) positioning the connector adjacent to a second well member which has a groove profile that has substantially the same configuration as the groove profile of the first well member but a different diameter than the first well member, the second locking member aligning with the profile of the second well member; and then (i) moving the second locking member to the locked position so that the tubular member is rigidly connected to the second well member.

2. The method of claim 1 wherein the step of moving the first locking member to the locked position comprises hydraulically moving a cam member axially which slidably engages a cam surface on the first locking member; and wherein the radial distances from the longitudinal axis of the connector to the cam surfaces of each of the locking members are equal.

3. The method of claim 1 wherein step (b) comprises providing the connector with a body having a set of circumferential spaced-apart windows; and wherein the first and second locking members are dogs which are slidably mounted in the windows.

4. The method of claim 3 wherein the body has an inner diameter which is sized to closely receive the first well member; and wherein when installing the second locking member, a flange is mounted to the inner diameter of the body to accommodate for a lesser outer diameter of the second well member.

5. The method of claim 3 wherein the groove profile of the second well member is closer to an upper end of the second well member than in the first well member; and wherein a lower insert is placed in each of the windows below the dogs of the second locking member to accommodate the different axial positions of the groove profiles.

6. The method of claim 1 wherein the tubular member has a lower end which abuts an upper end of the first and second well members and which has a groove profile spaced above the lower end; and wherein step (a) comprises:

providing first and second locking members which are collets, each having an upper lobe which engages the profile of the tubular member and a lower lobe which engages the profiles of the first and second well members; and wherein the upper lobes of the first and second locking members have the same radial dimension, and the lower lobes of the first and second locking members have different radial dimensions.

7. A method for connecting a tubular member to a first well member and then to a second well member which has a wall with a lesser outer diameter than the first well member but the same inner diameter, each of the first and second well members having an external groove profile, the groove profiles being substantially the same in configuration other than having different diameters, comprising:

(a) mounting the tubular member to a connector which has a longitudinal axis, a first radially movable locking member and a cam member which moves axially for moving the first locking member radially;

(b) lowering the connector over the first well member and moving the cam member to cause a groove engaging portion of the first locking member to engage the groove profile of the first well member; then (c) moving the cam member to cause the first locking member to release the profile of the first well member and removing the connector from the first well member; then (d) replacing the first locking member with a second locking member which has at least a portion of greater radial thickness than the first locking member and which has a substantially similar groove engaging portion as the first locking member; and then (e) lowering the connector over the second well member and moving the cam member to cause the groove engaging portion of the second locking member to engage the groove profile of the second well member, the groove engaging portion of the second locking member having a different inner diameter while in engagement with the second well member than an inner diameter of the first locking member while in engagement with the first well member.

8. The method of claim 7 wherein step (b) comprises providing the connector with a body having a set of circumferentially spaced-apart windows; and wherein the first and second locking members are dogs which are slidably mounted in the windows.

9. The method of claim 7 wherein the connector has an inner diameter which is sized to closely receive the first well member; and wherein when installing the second locking member, a cylindrical flange is mounted to an inner diameter of the connector to accommodate for a lesser outer diameter of the second well member.

10. The method of claim 8 wherein the groove profile of the second well member is closer to an upper end of the second well member than in the first well member; and wherein a lower insert is placed in each of the windows below the dogs of the second locking member to accommodate the different axial position of the groove profile of the second well member.

11. The method of claim 7 wherein the tubular member has a lower end which abuts an upper end of the first and second well members and which has a groove profile spaced above the lower end; and wherein step (a) comprises:

providing first and second locking members which are collets, each having an upper lobe which engages the profile of the tubular member and a lower lobe which engages the profile of the first and second well members; and wherein the upper lobes of the first and second locking members have the same radial dimension and the lower lobes of the first and second locking members have different radial dimensions.

12. An adjustable connector for connecting the lower end of a tubular member selectively to first and second well members, each of the well members having an external profile at an upper end, the external profiles having substantially the same configuration other than differing in diameter, one of the well members having a lesser outer diameter at the profile than the other, comprising:

a body having a longitudinal axis, the body having an annular portion adapted to surround an upper portion of each of the well members;

an axially movable cam located within annular portion of the body;

a first locking member removably carried by the annular portion of the body, having an inner profile which is adapted to engage the first well member, and having an outer surface which is engaged by the cam while being carried by the body;

a second locking member that is removably carried by the annular portion of the body in place of the first locking member after the first locking member has been removed, the second locking member having an inner profile which is adapted to engage the second well member and an outer surface which is engaged by the cam; and wherein each of the locking members is radially movable by the cam between locked and unlocked positions relative to its respective well member so that the tubular member may be adapted to be rigidly connected to said well members, the inner profile of the second locking member being substantially the same in configuration as the inner profile of the first locking member but having a different inner diameter while in the locked position.

13. The connector of claim 12 wherein a radial distance measured perpendicular to the longitudinal axis from the inner profile to the outer surface of the first locking member differs from a radial distance measured perpendicular to the longitudinal axis from the inner profile to the outer surface of the second locking member.

14. The connector of claim 12 wherein a radial distance measured from the longitudinal axis to the outer surface of the first locking member while engaging the first well member is the same as a radial distance measure from the longitudinal axis to the outer surface of the second locking member while engaging the second well member.

15. The connector of claim 12 wherein the annular portion of the body has a set of circumferentially spaced-apart windows; and wherein the first and second locking members are dogs which are slidably mounted in the windows.

16. The connector of claim 12 wherein the annular portion of the body has an inner diameter which is sized to closely receive the first well member; and wherein the connector further comprises:

a cylindrical flange releasably mounted to the inner diameter of the body for accommodating a lesser outer diameter of the second well member.

17. The connector of claim 15 wherein the profile of the second well member is closer to an upper end of the second well member than the profile of the first well member; and wherein the connector further comprises:

a lower insert releasably mounted in each of the windows below the dogs of the second locking member to accommodate the different axial positions of the profiles.

18. The connector of claim 12 wherein the tubular member has a lower end which abuts an upper end of the first well member while connected to the first well member, and which abuts an upper end of the second well member while connected to the second well member, the tubular member having a groove profile spaced above the lower end; and wherein the first and second locking members are collets, each having an upper lobe which engages the profile of the tubular member and a lower lobe which engages the profile of the first and second well members; and wherein the upper lobes of the first and second locking members have the same radial dimension and the lower lobes of the first and second locking members have different radial dimensions.

* * * * *